US011842511B2

(12) United States Patent
Sato

(10) Patent No.: US 11,842,511 B2
(45) Date of Patent: Dec. 12, 2023

(54) WORK ANALYZING SYSTEM AND WORK ANALYZING METHOD

(71) Applicant: PANASONIC INTELLECTUAL PROPERTY MANAGEMENT CO., LTD., Osaka (JP)

(72) Inventor: Yuji Sato, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 512 days.

(21) Appl. No.: 17/055,304

(22) PCT Filed: May 13, 2019

(86) PCT No.: PCT/JP2019/018998
§ 371 (c)(1),
(2) Date: Nov. 13, 2020

(87) PCT Pub. No.: WO2019/221081
PCT Pub. Date: Nov. 21, 2019

(65) Prior Publication Data
US 2021/0225029 A1    Jul. 22, 2021

(30) Foreign Application Priority Data

May 16, 2018   (JP) .................. 2018-094271

(51) Int. Cl.
*G06V 40/20*   (2022.01)
*G06T 7/73*    (2017.01)
*G06V 40/10*   (2022.01)

(52) U.S. Cl.
CPC .............. *G06T 7/74* (2017.01); *G06V 40/10* (2022.01); *G06V 40/20* (2022.01); *G06V 40/23* (2022.01);
(Continued)

(58) Field of Classification Search
CPC ...... G06Q 50/04; G06Q 10/06; G06Q 10/043; G06Q 10/06398; G06Q 10/103;
(Continued)

(56) References Cited

U.S. PATENT DOCUMENTS

2009/0237499 A1    9/2009  Kressel et al.
2016/0253618 A1*   9/2016  Imazawa .......... G06Q 10/06395
                                              705/7.15
2020/0293972 A1*   9/2020  Arao ..................... G06V 40/20

FOREIGN PATENT DOCUMENTS

CN   108596148 A  *  9/2018   ......... G06K 9/00362
CN   112560745 A  *  3/2021   ......... G06K 9/00268
(Continued)

OTHER PUBLICATIONS

Official Communication issued in International Patent Application No. PCT/JP2019/018998, dated Jul. 30, 2019, along with an English translation thereof.

*Primary Examiner* — Ian L Lemieux
(74) *Attorney, Agent, or Firm* — Greenblum & Bernstein, P.L.C.

(57) ABSTRACT

In order to enable, even when an increased number of workers become analysis targets, efficient analysis on work efficiency statuses of workers without putting a greater burden on an administrator to perform setting operations for the analysis, analytical information is produced by performing a joint position estimation based on respective frames of video recordings to estimate joint positions of a worker, performing a posture match determination based on results of the joint position estimation to determine whether or not to achieve a posture match between a posture of the worker in each frame of the video recordings and a predetermined reference body posture, and measuring, based on results of the posture match determination, a working time and a (Continued)

presence time of the worker used as analytical information on a work efficiency status of the worker.

9 Claims, 16 Drawing Sheets

(52) U.S. Cl.
CPC ............... *G06T 2207/10016* (2013.01); *G06T 2207/20081* (2013.01); *G06T 2207/30196* (2013.01)

(58) Field of Classification Search
CPC ..................... F16P 3/142; G05B 15/02; G05B 2219/40202; G05B 19/418; G05B 19/41865; G06T 1/00; G06T 2207/10016; G06T 2207/20081; G06T 2207/30196; G06T 7/20; G06T 7/73; G06T 7/74; G06V 40/23; G06V 20/64; G06V 40/10; G06V 40/20; G06V 40/28; H04N 5/772; H04N 5/783; H04N 5/91; H04N 7/181
See application file for complete search history.

(56) References Cited

FOREIGN PATENT DOCUMENTS

| | | | | |
|---|---|---|---|---|
| CN | 112819306 A | * | 5/2021 | |
| CN | 115457656 A | * | 12/2022 | |
| JP | 2006-190166 | | 7/2006 | |
| JP | 2007-243846 | | 9/2007 | |
| JP | 2009-032033 | | 2/2009 | |
| JP | 2009-289134 | | 12/2009 | |
| JP | 2009-545789 | | 12/2009 | |
| JP | 2017-134691 | | 8/2017 | |
| JP | 2017-151520 | | 8/2017 | |
| JP | 2017-220018 | | 12/2017 | |
| JP | 6444573 B2 | * | 12/2018 | ........... G05B 19/418 |
| JP | 6951685 B2 | * | 10/2021 | ........... G05B 19/418 |
| WO | WO-2019138877 A1 | * | 7/2019 | ........... G05B 19/418 |

* cited by examiner

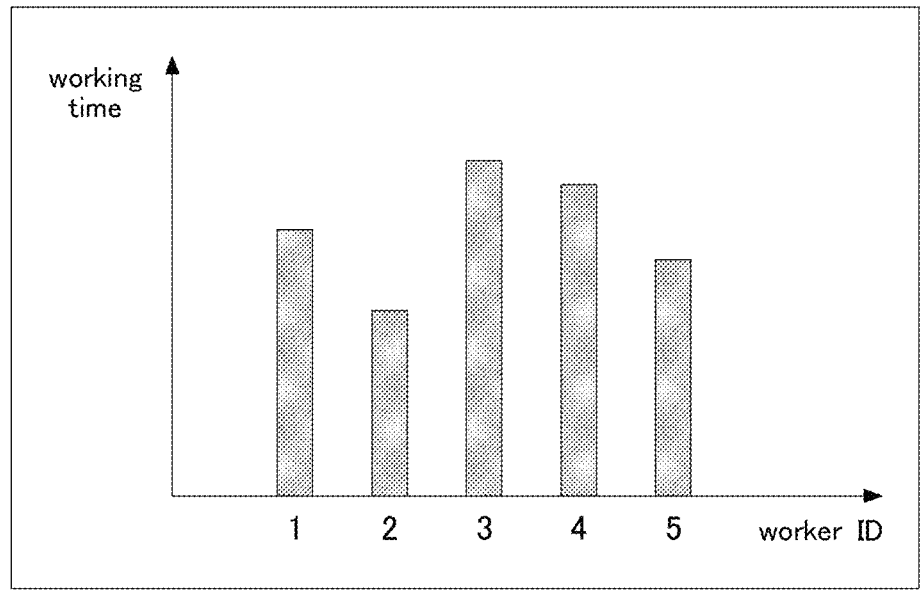
*Fig.16*A
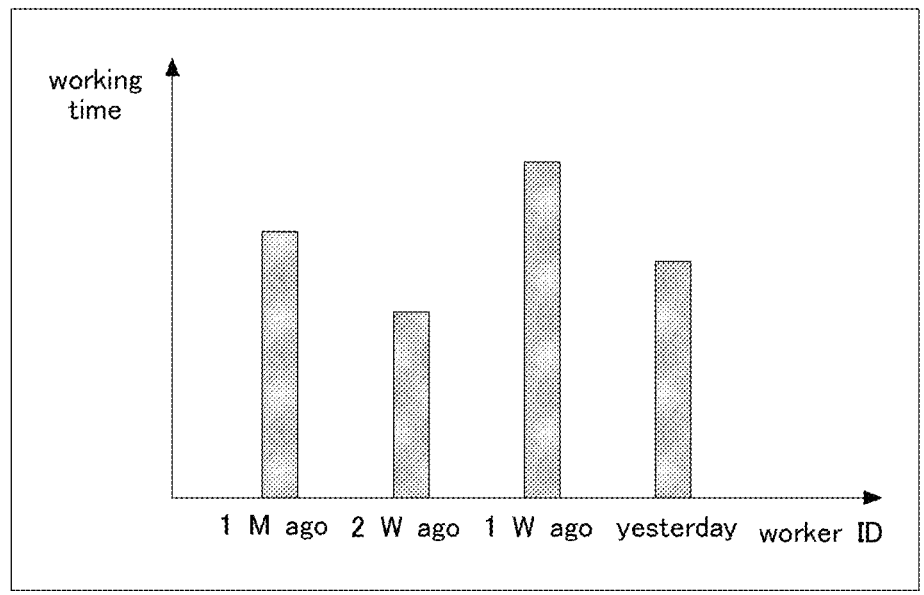
*Fig.16*B

WORK ANALYZING SYSTEM AND WORK ANALYZING METHOD

TECHNICAL FIELD

The present invention relates to a work analyzing device and a work analyzing method in which a processor is caused to perform operations to output analytical information on a work efficiency status of a worker based on video recordings of working activities of the worker.

BACKGROUND ART

In factories, operation efficiency can be improved by analyzing work efficiency statuses of workers and changing operating procedures or other ways of work based on results of the analysis. For this reason, there is a need for technologies for analyzing work efficiency statuses of workers in an efficient manner.

Known such technologies for analyzing work efficiency statuses of workers include a method which involves: capturing video recordings of working activities of a worker; extracting, from the video recordings, images including a predetermined image pattern in a predetermined portion of the image; determining a time when each extracted image is captured as start/end of a step of work; and calculating a time interval between the times determined for extracted images as working time (Patent Document 1).

PRIOR ART DOCUMENT (S)

Patent Document(S)

Patent Document 1: JP2007-243846A

SUMMARY OF THE INVENTION

Task to be Accomplished by the Invention

The above-described prior art focuses on the fact that an object associated with a step of work (e.g., bottle) usually appears in a fixed portion of each image, and takes advantage of this fact to analyze a work efficiency status of a worker. However, since different workers hold such an object in different ways, the prior art technology cannot make analysis with high precision without performing a setting operation for each worker to set a corresponding image pattern(s) and a corresponding portion(s) of an image where the object appears. This has caused a problem that, when an increased number of workers become analysis targets, there would be an undue burden on an administrator to perform the setting operations for the analysis.

The present invention has been made in view of the problem of the prior art, and a primary object of the present invention is to provide a work analyzing device and a work analyzing method in which, even when an increased number of workers become analysis targets, it is possible to make analysis on work efficiency statuses of the workers in an efficient manner, without putting a greater burden on an administrator to perform setting operations for the analysis.

Means to Accomplish the Task

An aspect of the present invention provides a work analyzing device in which a processor is caused to perform operations to output analytical information on a work efficiency status of a worker based on video recordings of working activities of the worker, wherein the processor is configured to: perform a joint position estimation based on the video recordings to estimate joint positions of the worker; perform a posture match determination based on results of the joint position estimation to determine whether or not to achieve a posture match between a posture of the worker and a predetermined reference body posture; and generate, based on results of the posture match determination, the analytical information on the work efficiency status of the worker.

Another aspect of the present invention provides a work analyzing method for causing a processor to perform operations to output analytical information on a work efficiency status of a worker based on video recordings of working activities of the worker, the operations comprising: performing a joint position estimation based on the video recordings to estimate joint positions of the worker; performing a posture match determination based on results of the joint position estimation to determine whether or not to achieve a posture match between a posture of the worker and a predetermined reference body posture; and generating, based on results of the posture match determination, the analytical information on the work efficiency status of the worker.

Effect of the Invention

According to the present invention, operations are performed to detect a match between a posture of a worker and a predetermined reference body posture based on joint positions of the worker, where the predetermined reference body posture corresponds to start/end of a step of work. As a result, even when an increased number of workers become analysis targets, it is possible to make analysis on work efficiency statuses of the workers in an efficient manner, without putting a greater burden on an administrator to perform setting operations for the analysis.

BRIEF DESCRIPTION OF THE DRAWINGS

FIGS. 16A and 16B are explanatory diagrams each showing an analysis result display screen according to the second variation of the embodiment of the present invention.

DESCRIPTION OF THE PREFERRED EMBODIMENT(S)

Figure 1:
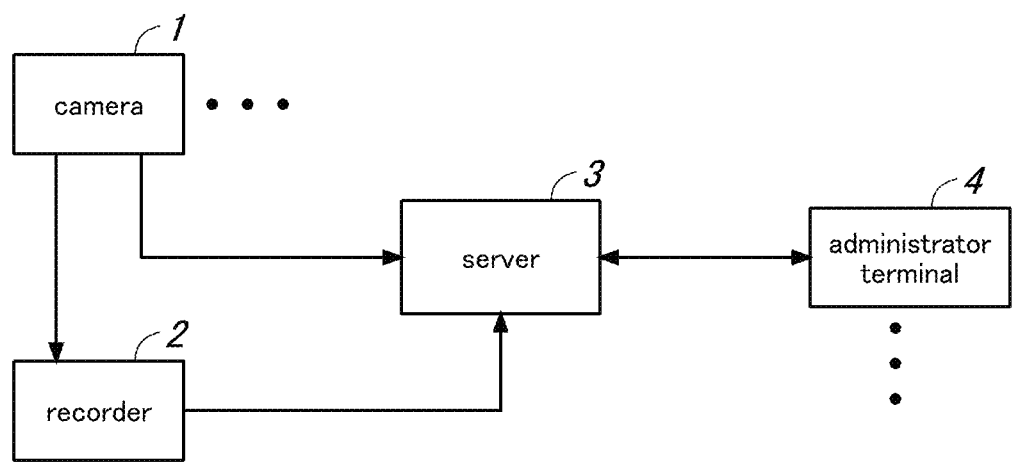
FIG. 1 is a diagram showing a general configuration of a work analyzing system according to an embodiment of the present invention.

A first aspect of the present invention made to achieve the above-described object is a work analyzing device in which a processor is caused to perform operations to output analytical information on a work efficiency status of a worker based on video recordings of working activities of the worker, wherein the processor is configured to: perform a joint position estimation based on the video recordings to estimate joint positions of the worker; perform a posture match determination based on results of the joint position estimation to determine whether or not to achieve a posture match between a posture of the worker and a predetermined reference body posture; and generate, based on results of the posture match determination, the analytical information on the work efficiency status of the worker.

In this configuration, operations are performed to detect a match between a posture of a worker and a predetermined reference body posture based on joint positions of the worker, where the predetermined reference body posture corresponds to start/end of a step of work. As a result, even when an increased number of workers become analysis targets, it is possible to make analysis on work efficiency statuses of the workers in an efficient manner, without putting a greater burden on an administrator to perform setting operations for the analysis.

A second aspect of the present invention is the work analyzing device of the first aspect, wherein the processor is configured to: by using machine learning, create machine-learned information for the joint position estimation and machine-learned information for the posture match determination, trained with video recordings for training, information records of joint positions of the worker in the video recordings, and information indicating whether or not to achieve the posture match; perform the joint position estimation based on the machine-learned information for the joint position estimation; and perform the posture match determination based on results of the joint position estimation and the machine-learned information for the posture match determination.

This configuration enables the joint position estimation and the posture match determination to be performed with high precision. Machine learning related operations may be performed by using a different device from the work analyzing device.

A third aspect of the present invention is the work analyzing device of the first or second aspect, wherein the processor is configured to: acquire, based on results of the posture match determination, a working time of the worker during which the worker has been actually working at the worker's place, as the analytical information.

This configuration enables an actual working time of each worker to be presented to an administrator. This allows the administrator to determine the working efficiency (skill level) of each worker.

A fourth aspect of the present invention is the work analyzing device of the third aspect, wherein the processor is configured to: perform a presence determination to determine whether or not the worker is present at the worker's place; and acquire, based on results of the presence determination, a presence time of the worker during which the worker has been present at the worker's place, as the analytical information.

This configuration enables a presence time of each worker to be presented to an administrator. As a result, the administrator can compare the working time with the presence time to thereby determine an amount of waste in the working activities of the worker.

A fifth aspect of the present invention is the work analyzing device of the third aspect, wherein the processor is configured to: acquire a working time of a skilled worker as a standard time; and compare the working time of the worker with the standard time, thereby acquiring evaluation information as the analytical information, the evaluation information including an evaluated value of working efficiency of the worker.

This configuration enables an evaluated value of working efficiency of each worker to be presented to an administrator. As a result, the administrator can easily grasp the working efficiency of each worker.

A sixth aspect of the present invention is the work analyzing device of any of the first to fifth aspects, wherein the processor is configured to: perform the posture match determination on each of a plurality of workers; create the analytical information on each worker based on results of the posture match determination for the worker; and perform statistic calculation on the analytical information on each worker to generate statistical information on the work efficiency status of the worker.

This configuration enables an administrator to easily do a comparison of work efficiency statuses of each worker.

A seventh aspect of the present invention is the work analyzing device of any of the first to sixth aspects, wherein the processor is configured to: perform the posture match determination to determine whether or not to achieve a posture match between the posture of the worker and any one of a plurality of predetermined reference body postures; and generate the analytical information based on the predetermined reference body posture for which the posture match is achieved.

This configuration can improve the precision of the work analysis, and enables various types of analyses. For example, presetting different predetermined reference body postures for respective steps of work enables identification of each step of work the worker is currently performing. In other cases, presetting respective different predetermined reference body postures for start and end of a step of work enables identification of respective times of start and end of the step of work.

An eighth aspect of the present invention is a work analyzing method for causing a processor to perform operations to output analytical information on a work efficiency status of a worker based on video recordings of working activities of the worker, the operations comprising: performing a joint position estimation based on the video recordings to estimate joint positions of the worker; performing a posture match determination based on results of the joint position estimation to determine whether or not to achieve a posture match between a posture of the worker and a predetermined reference body posture; and generating, based on results of the posture match determination, the analytical information on the work efficiency status of the worker.

In this configuration, even when an increased number of workers become analysis targets, it is possible to make analysis on work efficiency statuses of the workers in an efficient manner, without putting a greater burden on an administrator to perform setting operations for the analysis, in the same manner as the first aspect.

Embodiments of the present invention will be described below with reference to the drawings.

FIG. 1 is a diagram showing a general configuration of a work analyzing system according to an embodiment of the present invention.

The work analyzing system is configured to analyze a work efficiency status of a worker in a workplace such as a factory to thereby present results of the analysis to an administrator, and the system includes a camera 1, a recorder 2, a server 3 (work analyzing device), and an administrator terminal.

The camera 1 shoots working activities of the worker at the worker's place.

The recorder 2 records video data provided from the camera.

The server 3 acquires video recordings from the camera 1 and/or the recorder 2, analyzes the work efficiency status of the worker based on the video recording, and outputs results of the analysis.

The administrator terminal 4 is used by a system administrator or a work administrator, and is implemented by a PC, a tablet terminal, or any other suitable device. The system administrator uses the administrator terminal 4 to perform settings for various operations performed by the server 3. In addition, the administrator terminal 4 displays results of analyses provided from the server 3 so that the work administrator can view the results.

The operations performed by the server 3 may be real-time operations performed during the camera is shooting videos, or post-processing operations performed after the camera has shot videos. When the real-time operations are performed, the camera 1, the server 3, and the administrator terminal 4 may be connected via a network. When only the post-processing operations are performed, video recordings accumulated in the recorder 2 may be transferred to the server 3 by using an appropriate storage medium.

Figure 2:
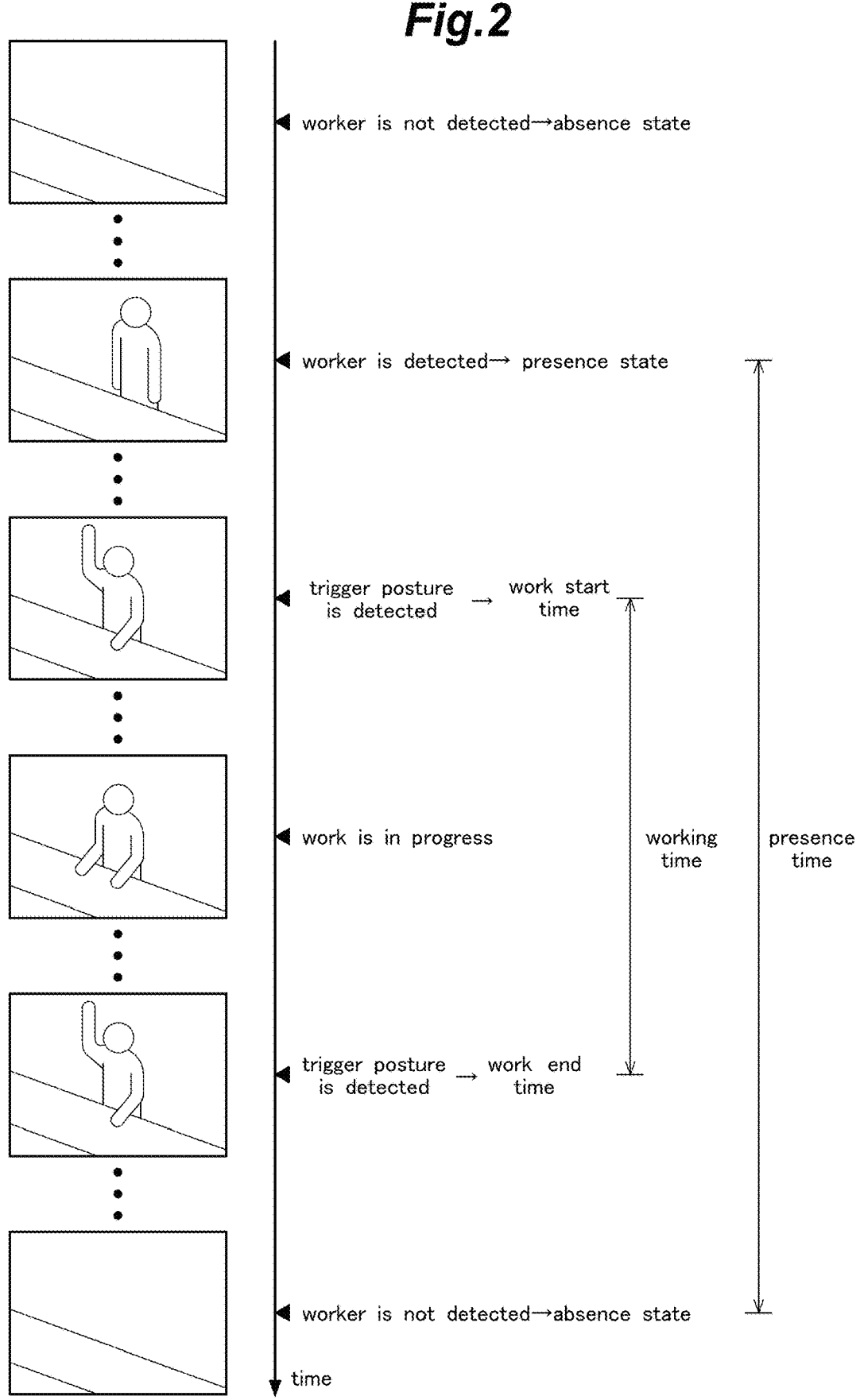
FIG. 2 is an explanatory diagram showing an outline of an analysis operation performed by a server 3.

Next, an analysis operations performed by the server 3 will be described. FIG. 2 is an explanatory diagram showing an outline of the analysis operation.

The server 3 performs a presence determination to determine whether or not the worker is present at the worker's place (worker's section) in each frame of the video recordings of working activities of the worker, and, based on results of the presence determination, measures a time (presence time) during which the worker has been actually working at the worker's place.

Specifically, when a worker appears in the video picture, the server 3 determines that the worker is present at the worker's place, and then acquires a presence time as a time period from a presence start time to a presence end time, where the presence start time is the time at which the state of video is changed from an absence state, in which the worker is not detected in the video, to a presence state, in which the worker is detected in the video, and where the presence end time is the time at which the state of video is changed from the presence state to the absence state.

The server 3 performs a trigger posture determination to determine whether or not the worker takes a predetermined trigger posture (reference body posture), and based on results of the trigger posture determination, measures a time period (working time) during which the worker has been actually working at the worker's place.

In the present embodiment, the trigger posture is a hand raise; which means that a worker raises his hand when he starts the work and also raises his hand when he finishes the work. The server 3 acquires a working time as a time period from a work start time to a work end time, where the work start time is the time at which the trigger posture is detected when the work is not in progress, and where the work end time is the time at which the trigger posture is detected when the work is in progress.

In the present embodiment, the worker takes the same trigger posture (a hand raise) at the start of the work and at the end of the work. However, the worker may take different trigger postures at the start of the work and at the end of the work, respectively. When the work includes a plurality of steps to be sequentially performed, the worker may take a trigger posture at the time of start or end of a step of work, for example, the time at which each step of work starts.

Figure 3:
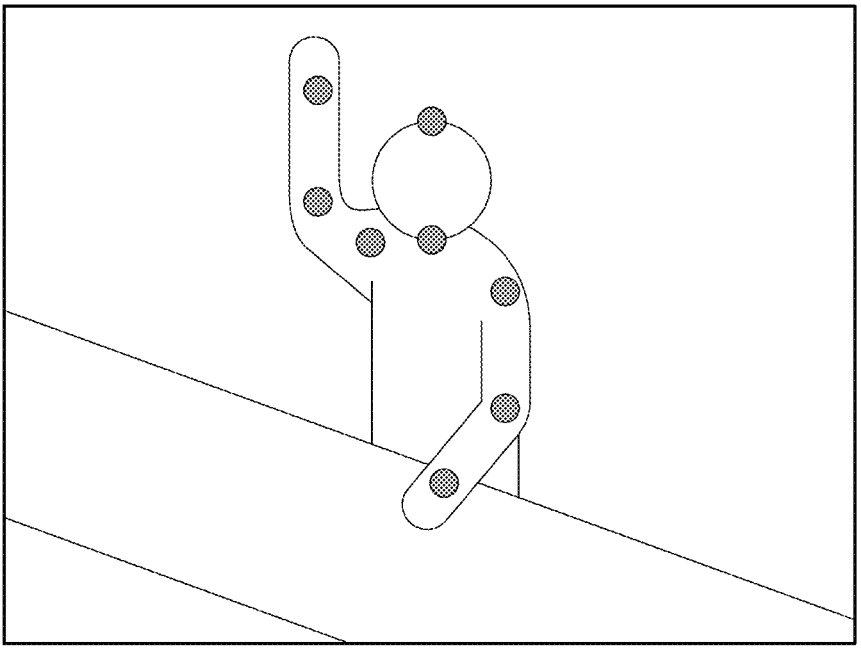
FIG. 3 is an explanatory diagram showing an outline of trigger posture detection performed by the server 3.
Figure 3:
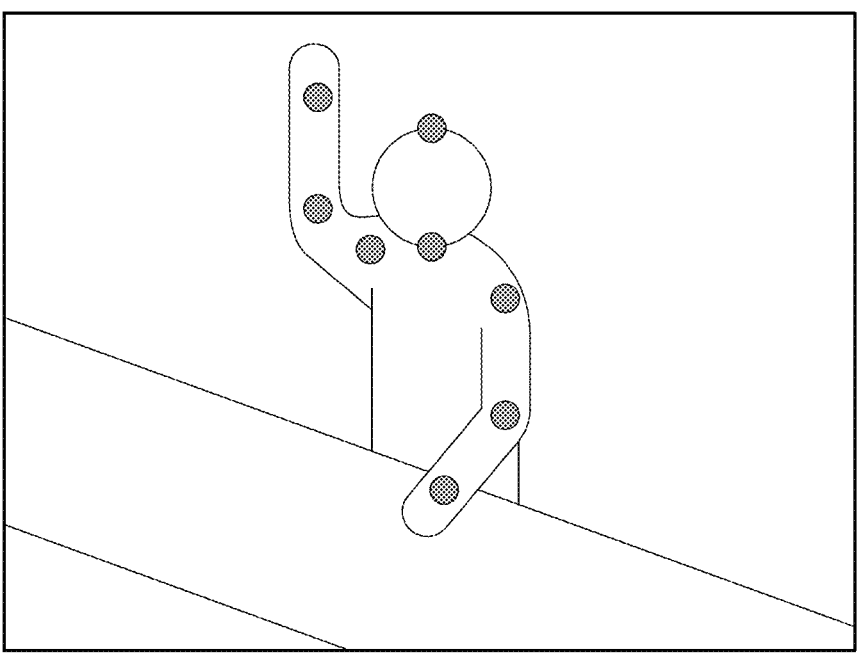

Next, trigger posture detection performed by the server 3 will be performed. FIG. 3 is an explanatory diagram showing an outline of the trigger posture detection.

In the present embodiment, the server 3 performs a joint position estimation to estimate joint positions (i.e. positions of joints) of the worker in each frame of the video recordings of working activities of the worker, and based on results of the joint position estimation, performs a posture match determination to determine whether or not to achieve a posture match between a posture of the worker and a trigger posture (a hand raise).

In the example shown in FIG. 3, since the lower body of the worker is hidden and not visible, eight joint positions or reference positions (the top of the head, neck, shoulders, elbows, and wrists) of the upper body of a worker are set as joints positions to be measured. If the entire body of the worker is visible, six joint positions of the lower body (both the hip joints, both knees, and both ankles) in addition to the 8 joint positions of the upper body may be set as joint positions to be measured.

Although, in the present embodiment, the trigger posture is set to be a raise hand, the trigger posture is not limited to this. For example, the trigger posture may be a stand-attention posture of the worker. Alternatively, the trigger posture may be a posture that the worker always takes during the work, instead of a posture that is not directly associated with the work like the above-described postures. For example, in the case of a worker of a welding operation, the trigger posture may be a posture which the worker takes when bringing a face guard mask close to the face. In some cases, the trigger posture may be a posture which the worker takes when pointing and confirming an instrument. In other cases, the trigger posture may be a posture which the worker takes when taking parts out of a case or container.

In some embodiments, the work analyzing system is configured such that a plurality of trigger postures are preset and the server 3 performs the posture match determination to determine whether or not to achieve a posture match between the posture of the worker and any one of the plurality of trigger postures. For example, presetting different trigger postures for respective steps of work enables identification of each step of work which the worker is currently performing. In other cases, presetting respective different trigger postures for start and end of a step of work enables identification of respective times of start and end of the step of work.

Figure 4:
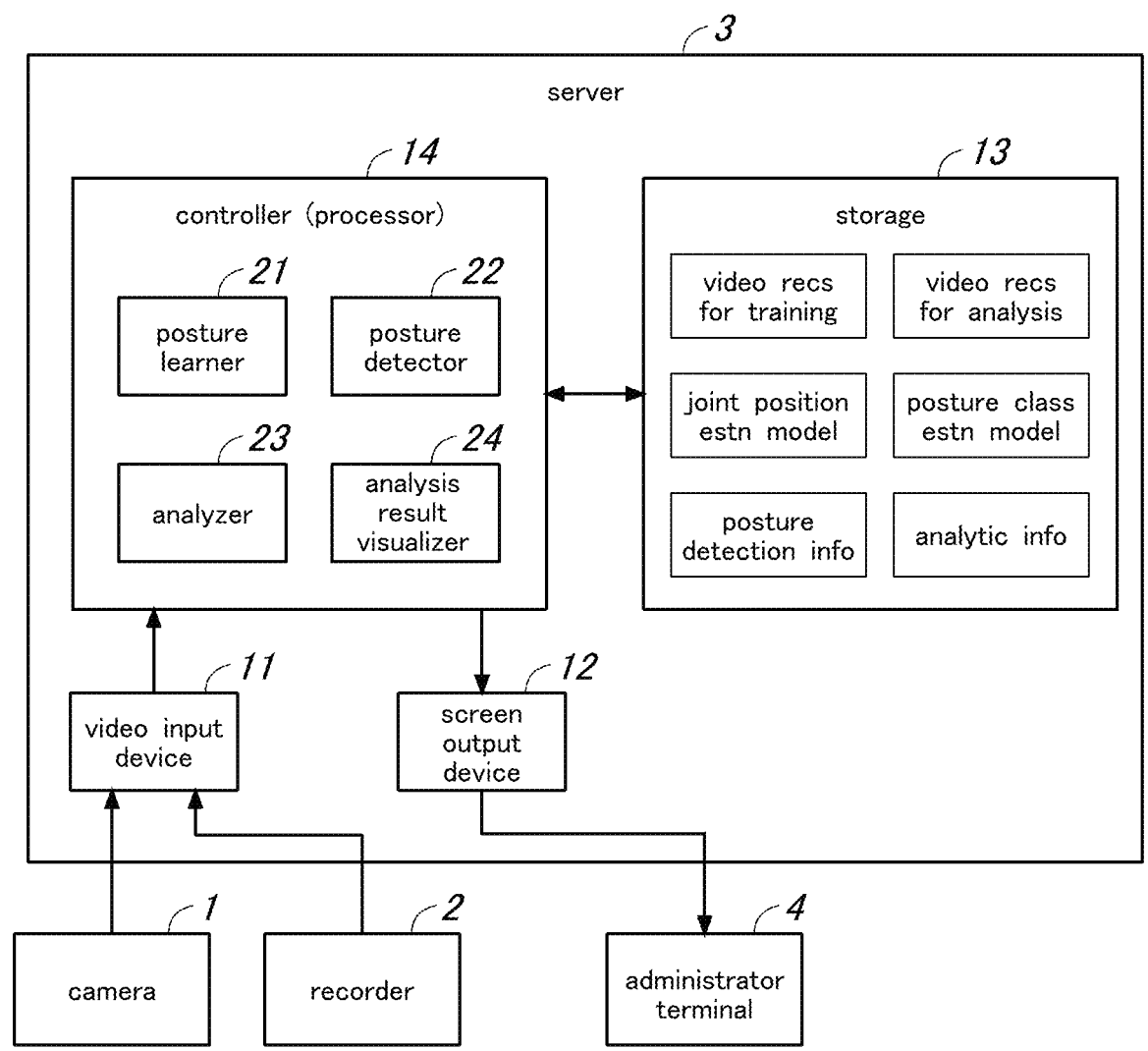
FIG. 4 is a block diagram showing a schematic configuration of the server 3.

Next, a schematic configuration of the server 3 will be described. FIG. 4 is a block diagram showing a schematic configuration of the server 3.

The server 3 includes a video input device 11, a screen output device 12, a storage 13, and a controller 14.

When the server 3 performs real-time operations, the video input device 11 receives video data shot by the camera 1. When the server 3 performs post-processing operations, the video input device 11 receives at video recordings recorded in the recorder 2.

The screen output device 12 outputs an analysis result display screen generated by the controller 14, and the analysis result display screen is displayed on the administrator terminal 4.

The storage 13 stores programs executed by a processor which implements the controller 14. The storage 13 stores video recordings (video recordings for training and analysis) acquired by the video input device 11. The storage 13 stores joint position estimation models, posture class estimation models (machine-leaned information trained with video recordings), posture detection information, and analytical information generated by the controller 14.

The controller 14 includes a posture learner 21, a posture detector 22, an analyzer 23, and an analysis result visualizer 24. The controller 14 is configured by the processor, and each unit of the controller 14 is implemented by executing a program(s) stored in the storage 13 by the processor.

The posture learner 21 generates a joint position estimation model (machine-learned information used for joint position estimation) and a posture class estimation model (machine-learning information used for posture match determination (to determine whether or not the worker takes any of predetermined reference body posture trigger postures)), the joint position estimation model and that posture class estimation model being trained with video recordings for training.

The posture detector 22 performs a joint position estimation by using the joint position estimation model and the posture class estimation model acquired by the posture learner 21 to estimate joint positions of the worker based on the video recordings, and performs a posture match determination based on results of the joint position estimation to determine whether or not to achieve a posture match between a posture of the worker and a trigger posture (i.e., determine whether or not the worker takes a trigger posture), thereby acquiring posture detection information including results of the joint position estimation and those of the posture match determination.

The analyzer 23 generates analytic information on the work efficiency status of the worker based on the posture detection information acquired by the posture detector 22.

The analysis result visualizer 24 visualizes the analytic information acquired by the analyzer 23 and presents the information to an administrator. In the present embodiment, the analysis result visualizer 24 generates an analysis result display screen and displayed it on the administrator terminal 4.

Figure 5:
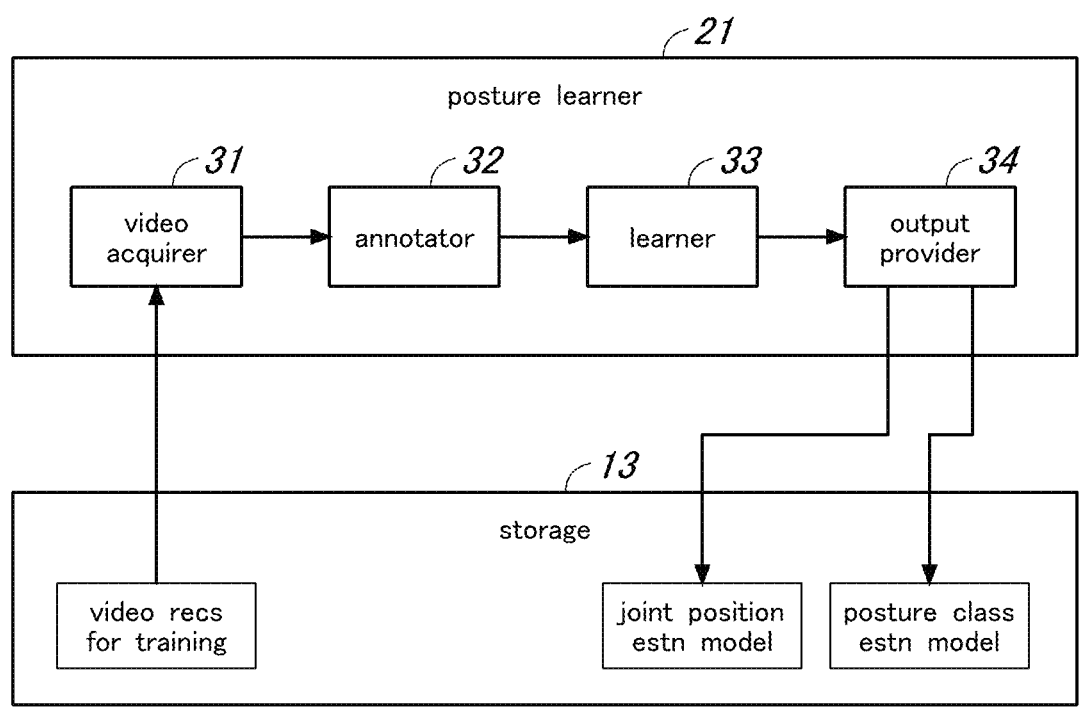
FIG. 5 is a block diagram showing a schematic configuration of a posture learner 21 of the server 3.

Next, a posture learner 21 of the server 3 will be described. FIG. 5 is a block diagram showing a schematic configuration of the posture learner 21 of the server 3.

The posture learner 21 is configured to generate a joint position estimation model and a posture class estimation model trained with video recordings for training, and the posture learner 21 includes a video acquirer 31, an annotator 32, a learner 33, and an output provider 34.

The video acquirer 31 acquires video recordings for training from the storage 13. The video recordings for training are video recordings of working activities of a worker selected as the representative worker, shot by the camera 1.

In response to entries provided by the administrator, the annotator 32 sets joint positions of the worker and a posture class label indicating whether or not the posture of the worker is a trigger posture, for each frame image of the video recordings for training, to thereby generate annotation information. The annotation information includes joint positions and a posture class label which are associated with the ID (frame number) of each frame image.

In the present embodiment, the controller first performs a joint position estimation on each frame image for training by using a pre-prepared joint position estimation model to estimate joint positions of a worker. If there is an error in the joint positions obtained by the joint position estimation, the system urges an administrator to correct the error so as to set the corrected joint positions.

By using machine learning (deep learning), the learner 33 creates the joint position estimation model and the posture class estimation model, trained with video recordings for training and annotation information acquired by the annotator 32. The joint position estimation model is a neural network which receives, as input information, each frame image of video recording for training and joint positions of a worker in the frame images, estimates a posture class from the input information, and outputs the posture class as output information. Any known technology may be used for the machine learning.

The output provider 34 stores, in the storage 13, the joint position estimation model and the posture class estimation model generated by the learner 33.

Figure 6:
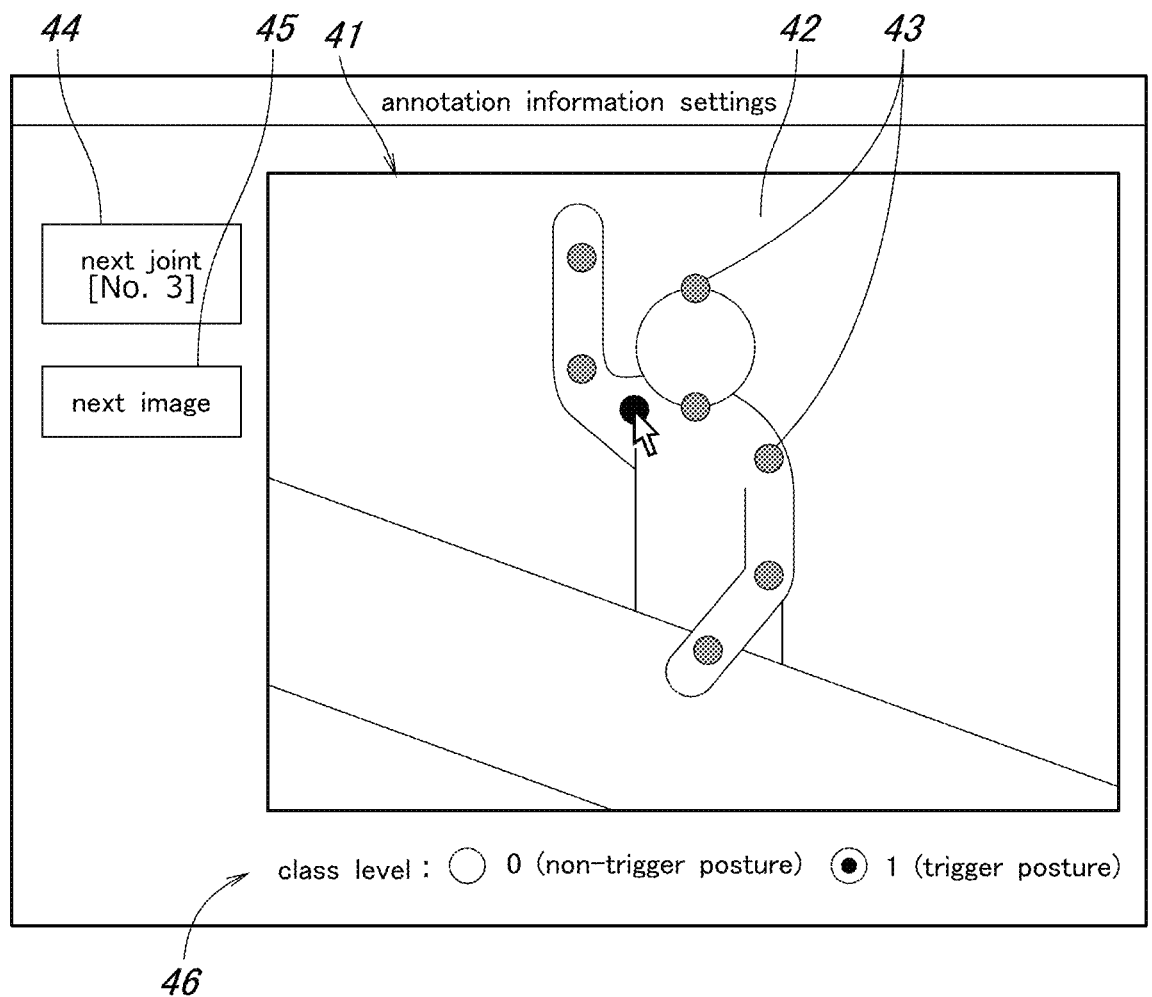
FIG. 6 is an explanatory diagram showing an annotation information setting screen displayed on an administrator terminal 4.

Next, an annotation information setting screen displayed on the administrator terminal 4 will be described. FIG. 6 is an explanatory diagram showing the annotation information setting screen.

The administrator terminal 4 displays the annotation information setting screen used to set annotation information (joint positions and posture class labels in the video for training).

This annotation information setting screen includes an image display section 41. The image display section 41 displays a frame image 42 of video recordings for training. The image display section 41 includes marks 43 indicating the joint positions of a worker shown in the frame image 42. In the initial state of the screen, the image display section 41 includes marks 43 corresponding to the joint positions acquired through the joint position estimation using a pre-prepared joint position estimation model.

In addition, the annotation information setting screen includes a "next joint" button 44 and a "next image" button 45. If all the joint positions shown in the image display section 41 are appropriately positioned, the administrator operates the "next image" button 45 to proceed to the step of confirmation of the next frame image. If there is a joint position inappropriately positioned, the administrator operates the "next joint" button 44 to select the mark 43 to be corrected, and then the administrator operates the input device such as a mouse and designates the correct position.

The annotation information setting screen includes a class label designation section 46. The class label designation section 46 is used to designate whether or not a worker in the frame image 42 takes a trigger posture (posture class label).

Specifically, when the worker is not in the trigger posture, "0" is selected, whereas, when the worker is in the trigger posture, "1" is selected.

Figure 7:
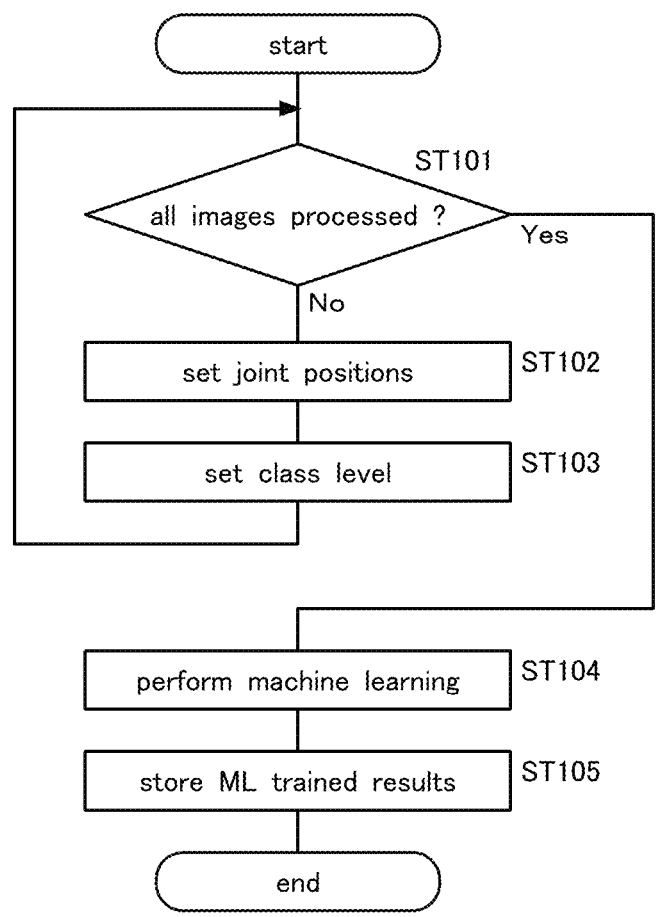
FIG. 7 is a flow chart showing a procedure of a posture learning operation performed by the server 3.

Next, a procedure of a posture learning operation performed by the server 3 will be described. FIG. 7 is a flow chart showing a procedure of the posture learning operation.

In the posture learner 21 of the server 3, first, the video acquirer 31 acquires video recordings for training from the storage 13 and determines whether or not all the frame images have been processed (ST101).

If all the frame images have not been processed (No in ST101), the annotator 32, in response to entries provided by the administrator, sets joint positions for a frame image (ST102). Also, the annotator 32, in response to entries provided by the administrator, sets a posture class label for the frame image (ST103). Then, the process returns to ST101.

If all the frame images have been processed (Yes in ST101), the learner 33, by using machine learning (ML), creates machine-learned information relating to the annotation information (i.e. joint positions and a posture class label for each frame image in video recordings for training) (ST104). Next, the output provider 34 stores machine learning (ML) trained results (i.e. a joint position estimation model and a posture class estimation model generated by the learner 33) in the storage 13 (ST105).

Figure 8:
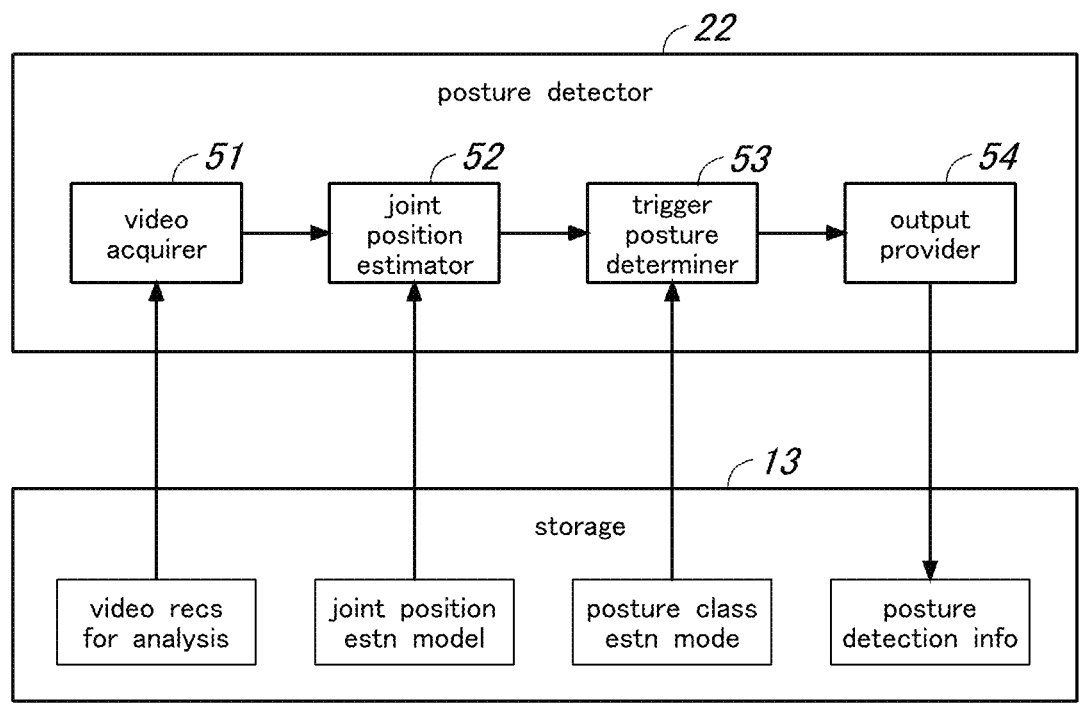
FIG. 8 is a block diagram showing a schematic configuration of a posture detector 22 of the server 3.

Next, a schematic configuration of a posture detector 22 of the server 3 will be described. FIG. 8 is a block diagram showing a schematic configuration of the posture detector 22.

The posture detector 22 is configured to detect a match between a posture of a worker and a trigger posture in each frame image of video recordings for analysis, and the posture detector 22 includes a video acquirer 51, a joint position estimator 52, a trigger posture determiner 53, and an output provider 54.

The video acquirer 51 acquires video recordings for analysis from the storage 13.

The joint position estimator 52, by using the joint position estimation model stored in the storage 13, detects a worker in each frame image of the video recordings for analysis, and estimates the joint positions of the worker.

The trigger posture determiner 53, using a posture class estimation model stored in the storage 13, performs a posture match determination based on joint positions of a worker in each frame image acquired by the joint position estimator 52 to thereby determine whether or not to achieve a posture match between a posture of the worker and a trigger posture. The posture match determination may be performed based on joint positions of the worker in a plurality of frame images.

The output provider 54 stores, in the storage 13, the joint positions acquired by the joint position estimator 52 and the determination results provided by the trigger posture determiner 53 (i.e., posture class labels indicating whether or not the worker takes a trigger posture) as posture detection information. The posture detection information includes joint positions and a posture class label which are associated with the ID (frame number) of each frame image.

Figure 9:
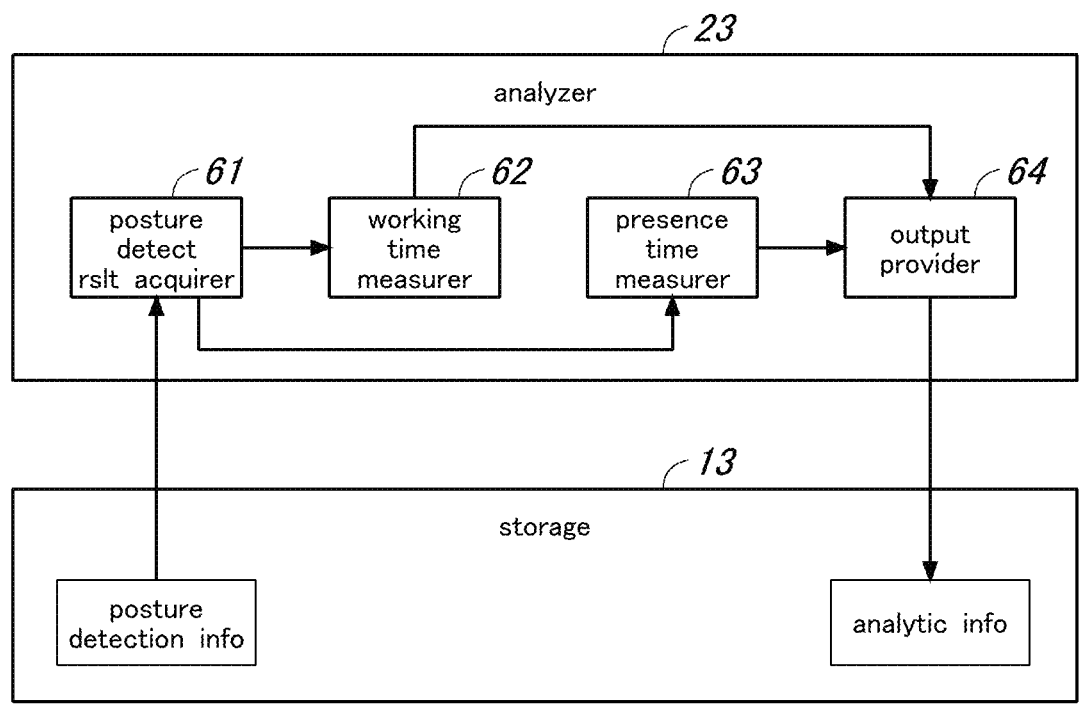
FIG. 9 is a block diagram showing a schematic configuration of an analyzer 23 of the server 3.

Next, an analyzer 23 of the server 3 will be described. FIG. 9 is a block diagram showing a schematic configuration of the analyzer 23 of the server 3.

The analyzer 23 is configured to generate analytical information on a work efficiency status of a worker based on the posture detection information acquired by the posture detector 22, and the analyzer 23 includes a posture detection result acquirer 61, a working time measurer 62, a presence time measurer 63, and an output provider 64.

The posture detection result acquirer 61 acquires posture detection information stored in the storage 13.

The working time measurer 62 measures a time (working time) during which a worker has been actually working at the worker's place. Specifically, the working time measurer 62 acquires a working time as a time period from a work start time to the present time, where the work start time is the time at which the trigger posture is detected when the work is not in progress. Also, the working time measurer 62 acquires a working time as a time period from the work start time to a work end time, where the work end time is the time at which the trigger posture is detected when the work is in progress.

The presence time measurer 63 measures a time (a presence time) during which a worker has been actually present at the worker's place. Specifically, the presence time measurer 63 acquires a presence time as a time period from a presence start time to the present time, where the presence start time is the time at which the worker is detected in video recordings. Also, the presence time measurer 63 acquires a presence time as a time period from the presence start time to a presence end time, where the presence end time is the time at which the worker is no longer detected.

In the presence time measurer 63, the presence start time may be the time at which valid joint positions and a valid posture class label is found, and the presence end time may be the time at which joint positions and a posture class label becomes invalid; that is, joint positions and a posture class label become "−1."

The output provider 64 stores, in the storage 13, the working time acquired by the working time measurer 62 and the presence time acquired by the presence time measurer 63 as analytical information.

Figure 10:
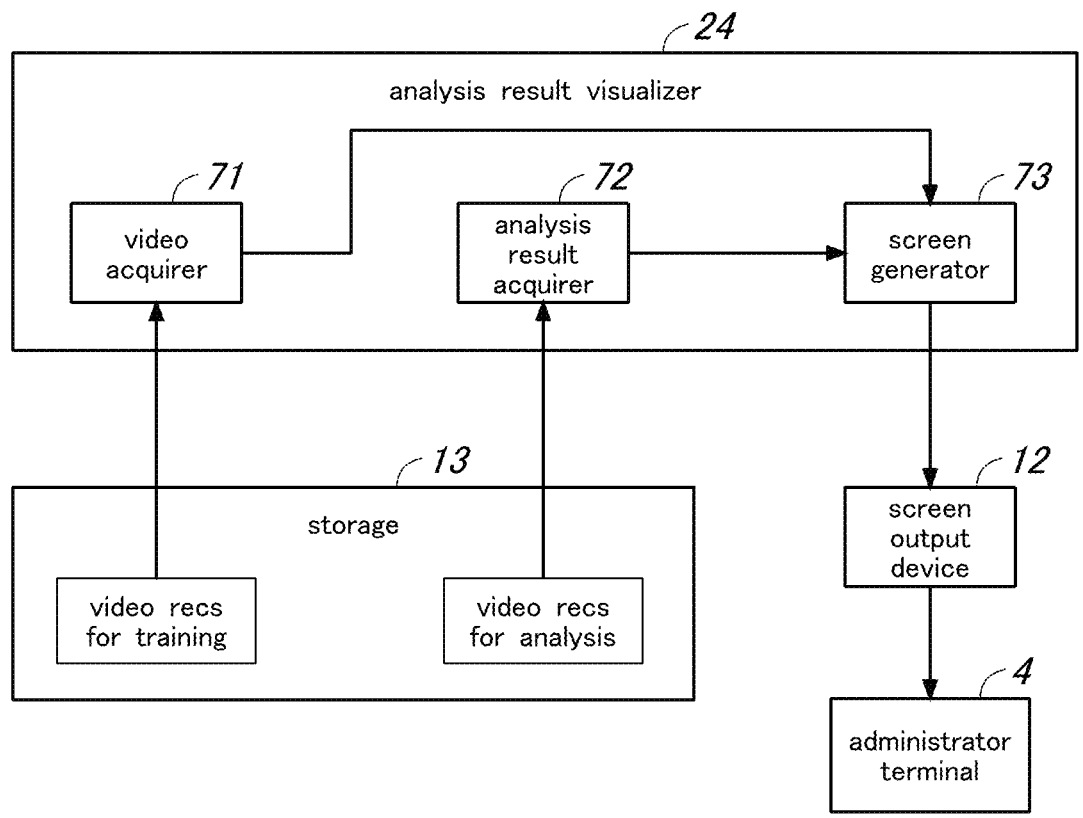
FIG. 10 is a block diagram showing a schematic configuration of an analysis result visualizer 24 of the server 3.

Next, an analysis result visualizer 24 of the server 3 will be described. FIG. 10 is a block diagram showing a schematic configuration of the analysis result visualizer 24 of the server 3.

The analysis result visualizer 24 is configured to visualize analytical information generated by the analyzer 23, and the analysis result visualizer 24 includes a video acquirer 71, an analysis result acquirer 72, and a screen generator 73.

The video acquirer 71 acquires video recordings for analysis from the storage 13.

The analysis result acquirer 72 acquires analytical information (a working time and a presence time) from the storage 13.

The screen generator 73 generates an analysis result display screen which visualizes analytical information. The analysis result display screen is output from the screen output device 12 to the administrator terminal 4, and the analysis result display screen is displayed on the administrator terminal 4. In the present embodiment, video recordings for analysis are displayed on the analysis result display screen, and analytical information (a working time and a presence time) is displayed.

Figure 11:
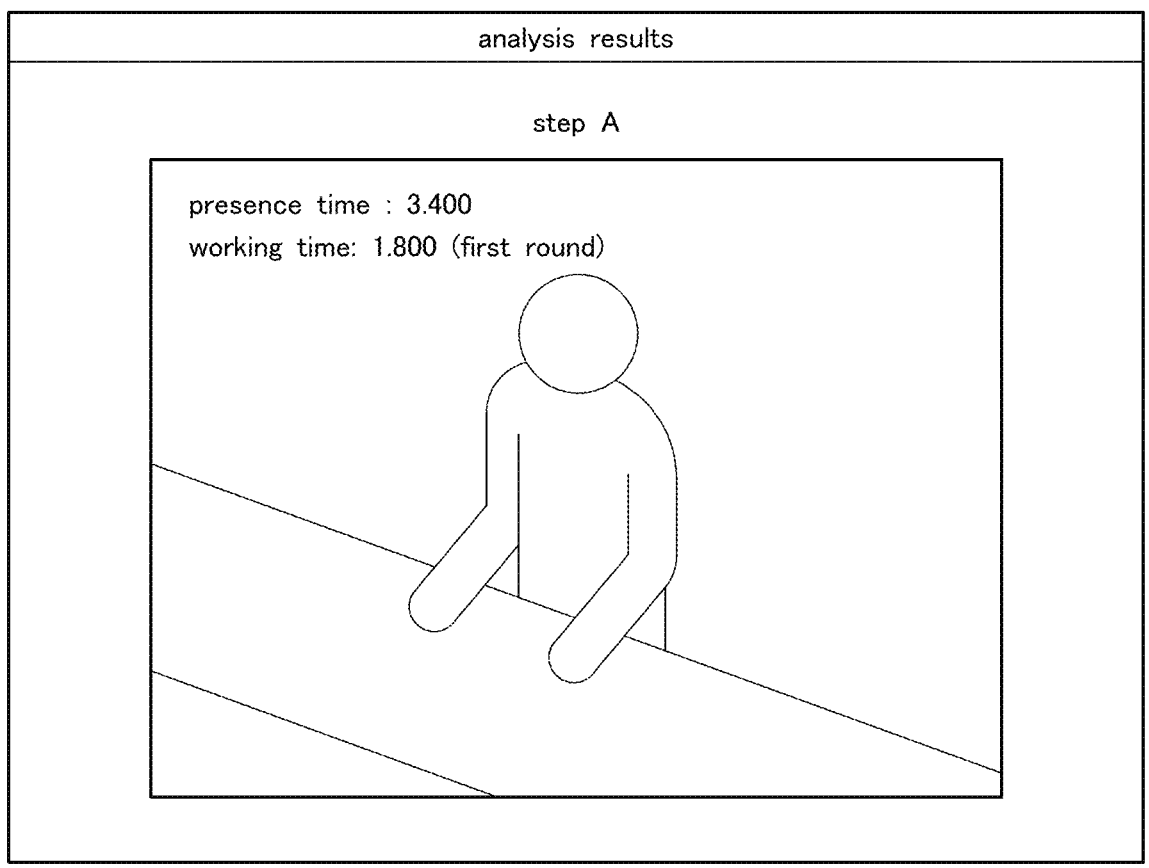
FIG. 11 is an explanatory diagram showing an analysis result display screen displayed on the administrator terminal 4.

Next, an analysis result display screen displayed on the administrator terminal 4 will be described. FIG. 11 is an explanatory diagram showing the analysis result display screen.

The analysis result display screen displays video for analysis, and analytical information; that is, a working time and a presence time are superimposed and displayed on the video.

When the work includes a plurality of steps of work to be sequentially and repeatedly performed, the presence time is an accumulated time through all the steps. In this case, when a worker leaves at the worker's place between the two steps, the absence time during the worker was absent is excluded. The working time is a working time for the current step which the worker in the video is currently working on, and the analysis result display screen displays the number of rounds of the current step which have been performed (e.g., the first round).

In this way, the analysis result display screen displays a presence time and a working time, and an administrator can determine, from the working time, whether or not a worker works in an efficient manner. When the presence time and the working time are largely different from each other; that is, the time period from when the worker comes to the place to when the worker starts working is long, the administrator can determine, from working activities of the worker shown in the video, a reason why the worker delays staring the work. Although the analysis result display screen in the present embodiment displays both a presence time and a working time, the screen may display only one of the presence time and the working time selected based on entries provided by the administrator through a setting screen (not shown).

Figure 12:
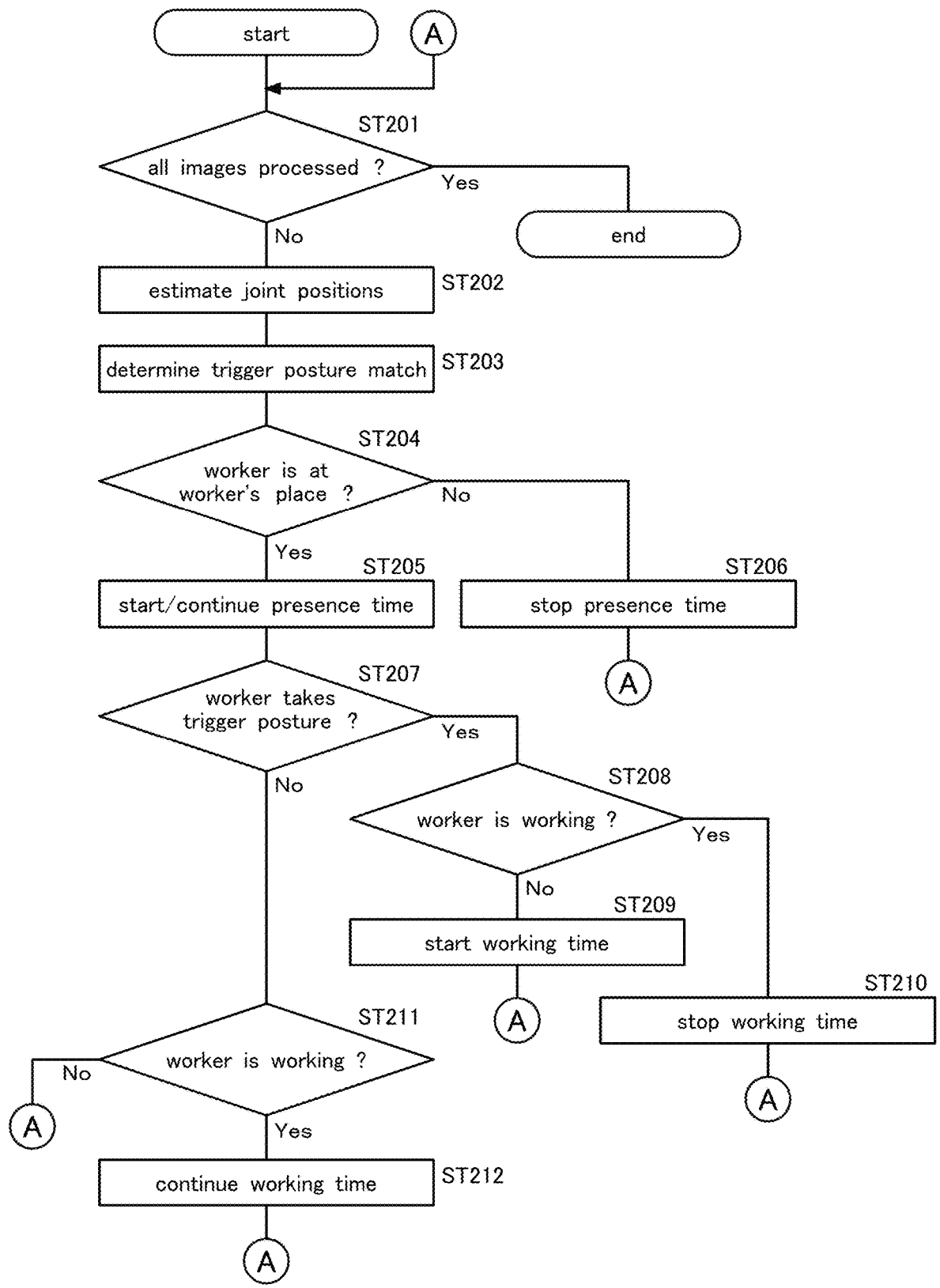
FIG. 12 is a flow chart showing a procedure of a posture detection and analysis operation performed by a server 3.

Next, a posture detection and analysis operation performed by a server 3 will be described. FIG. 12 is a flow chart showing a procedure of the posture detection and analysis operation.

In the server 3, first, the video acquirer 51 of the posture detector 22 determines whether or not all the frame images of video recordings for analysis have been processed (ST201). If all the frame images have not been processed (No in ST201), the joint position estimator 52 performs a joint position estimation to estimate joint positions of a worker from the target frame image (ST202). Next, the trigger posture determiner 53 performs a posture match determination to determine whether or not to achieve a posture match between a posture of the worker and a trigger posture, and sets a corresponding posture class label (ST203).

Next, the presence time measurer 63 of the analyzer 23 determines whether or not the worker is present at the worker's place (ST204).

If the worker is present at the worker's place (Yes in ST204), the presence time is started and continued (ST205). If the worker is not present at the worker's place by the previous time, the presence time is started, while if the worker is present at the worker's place by the previous time, the presence time is continued.

Next, the working time measurer 62 determines whether or not to achieve a posture match between a posture of the worker and a trigger posture (i.e., whether or not the worker takes the trigger posture) based on the posture class label (ST207).

If a posture match is achieved; that is, the worker takes a trigger posture (Yes in ST207), then the analyzer 23 determines whether or not the worker is working (ST208). If the worker is not working (No in ST208), the working time is started (ST209). Then, the process returns to ST201. If the worker is working (Yes in ST208), the working time is stopped (ST210). Then, the process returns to ST201.

If a posture match is not achieved; that is, the worker does not take a trigger posture (Yes in ST207), then the analyzer 23 determines whether or not the worker is working (ST211). If the worker is not working (No in ST211), the process returns to ST201. If the worker is working (Yes in ST211), the working time is continued (ST212). Then, the process returns to ST201.

If the worker is not present at the worker's place (No in ST204), the presence time is stopped (ST206). Then, the process returns to ST201.

If all the images have been processed (Yes in ST201), the process is ended.

In this way, the server 3 measures a working time and a presence time, and the administrator terminal 4 displays the working time and the presence time on the analysis result display screen (see FIG. 11).

Figure 13:
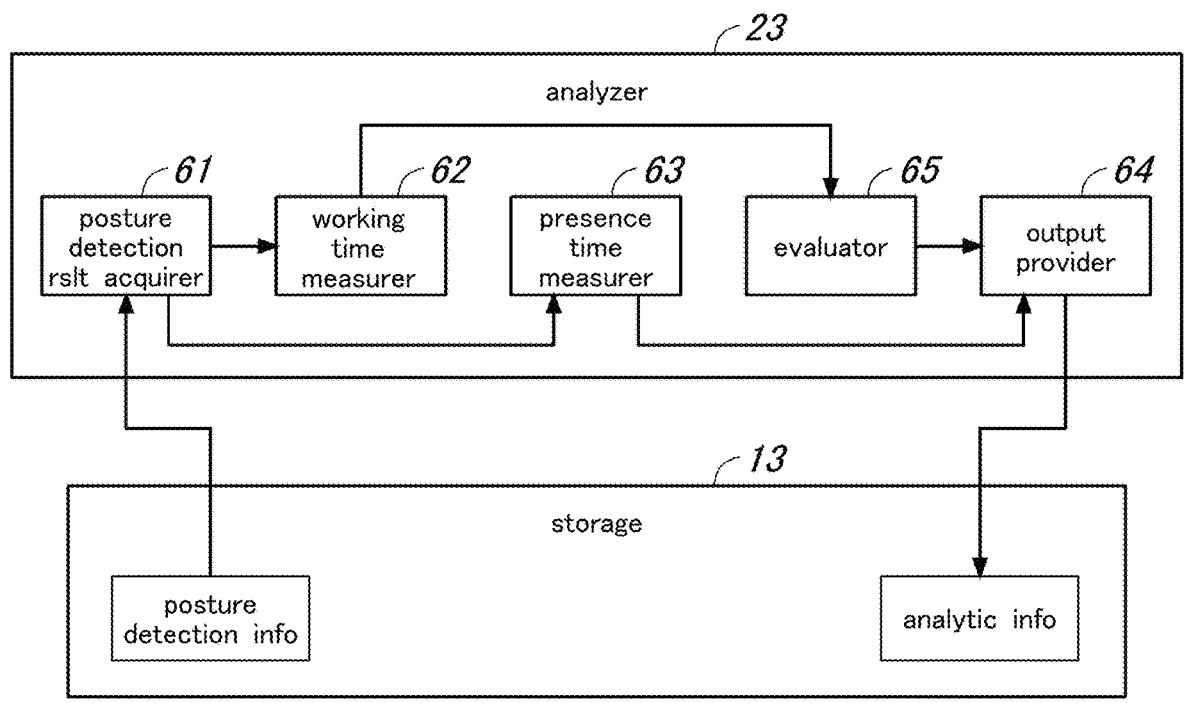
FIG. 13 is a block diagram showing a schematic configuration of an analyzer 23 according to a first variation of the embodiment of the present invention.

Next, a first variation of the embodiment of the present invention will be described. FIG. 13 is a block diagram showing a schematic configuration of an analyzer 23 according to the first variation of the embodiment.

In this variation, the analyzer 23 includes an evaluator 65. The evaluator 65 acquires a working time of a skilled worker as a standard time, compares a working time of a target worker with the standard time to provide evaluation information indicating an evaluation of a skill level (working efficiency) of the worker. The standard time may be acquired by having a skilled worker actually perform the work.

Specifically, for example, the analyzer 23 compares a working time of a worker with first and second threshold values and evaluates a skill level of the worker on a scale of three. That is, when the difference between the working time and the standard time is less than the first threshold value, the analyzer 23 determines that the skill level is "good" (A). When the difference is equal to or greater than the first threshold value and less than the second threshold value, the analyzer 23 determines that the skill level is "passing" (B). When the difference is equal to or greater than the second threshold value, the analyzer 23 determines that the skill level is "failing" (C).

Figure 14:
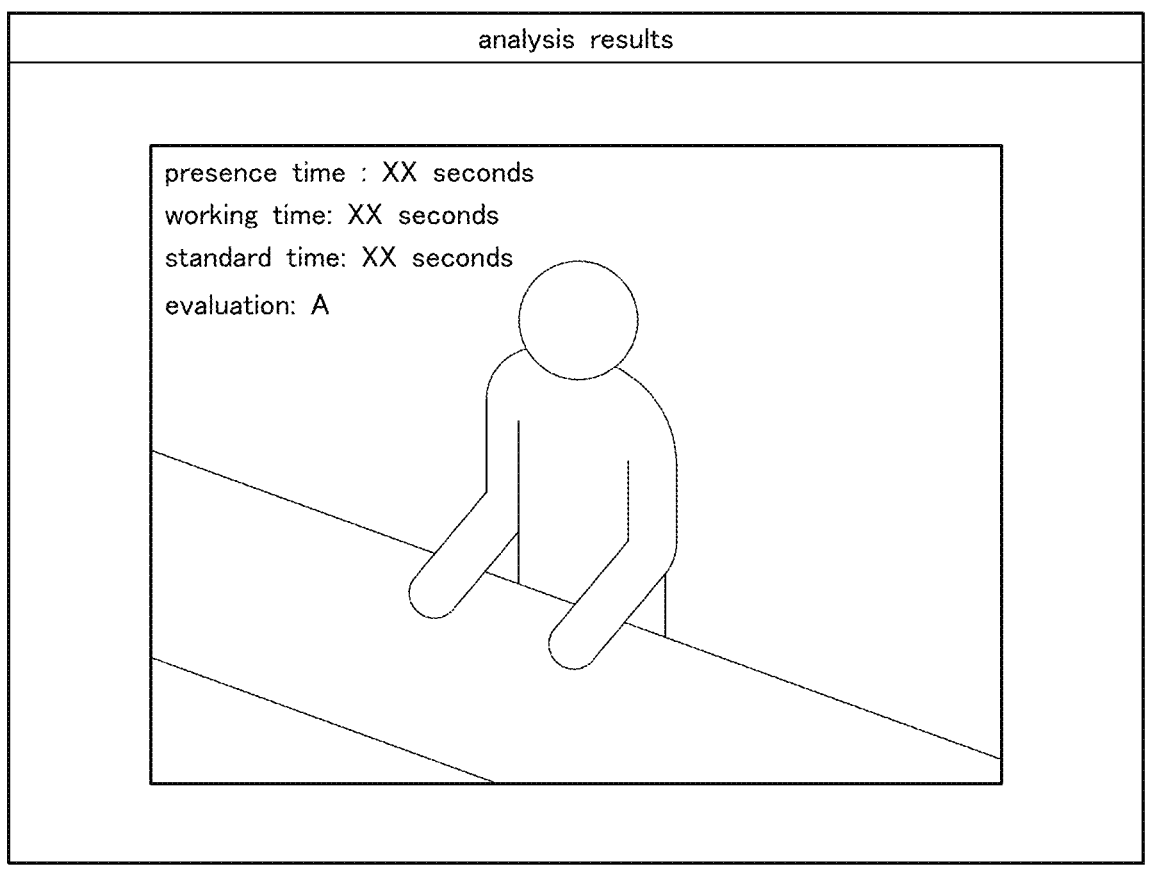
FIG. 14 is an explanatory diagram showing an analysis result display screen according to the first variation of the embodiment of the present invention.

Next, an analysis result display screen according to the first variation of the embodiment will be described. FIG. 14 is an explanatory diagram showing the analysis result display screen according to the first variation of the embodiment.

In the first variation of the embodiment, the analysis result display screen displays a video picture shot by the camera 1 and shows results of analysis, such as a presence time, a working time, a standard time, and a skill level evaluation result (A, B, C). The evaluation result may be represented by an attribute(s) of figures (characters) of the working time. For example, the evaluation result may be represented by a color(s) of figures of the working time (green, blue, red) or by size, thicknesses, blinking speed, or any other attribute of figures of the working time.

When the work includes a plurality of steps of work to be sequentially and repeatedly performed, the presence time is an accumulated time through all the steps. In addition, the working time is a working time for the current step which the worker in the video is currently working on, the standard time is a standard time for the current step, and the evaluation result is an evaluation result for the current step.

In this way, in the first variation of the embodiment, the analysis result display screen displays a presence time, a working time, a standard time, and a skill level evaluation result (A, B, C). As a result, an administrator can determine, from the evaluation result, a skill level (working efficiency) of a target worker.

Although, in the first variation of the embodiment, the analysis result display screen displays a skilled level evaluation result and any other analysis result, the screen may display a list of evaluation results for respective workers. In addition, although the analysis result display screen in the present embodiment displays a presence time, a working time, a standard time, and an evaluation result, a presence time or a standard time may be omitted from the screen in response to entries provided by the administrator through a setting screen (not shown).

Figure 15:
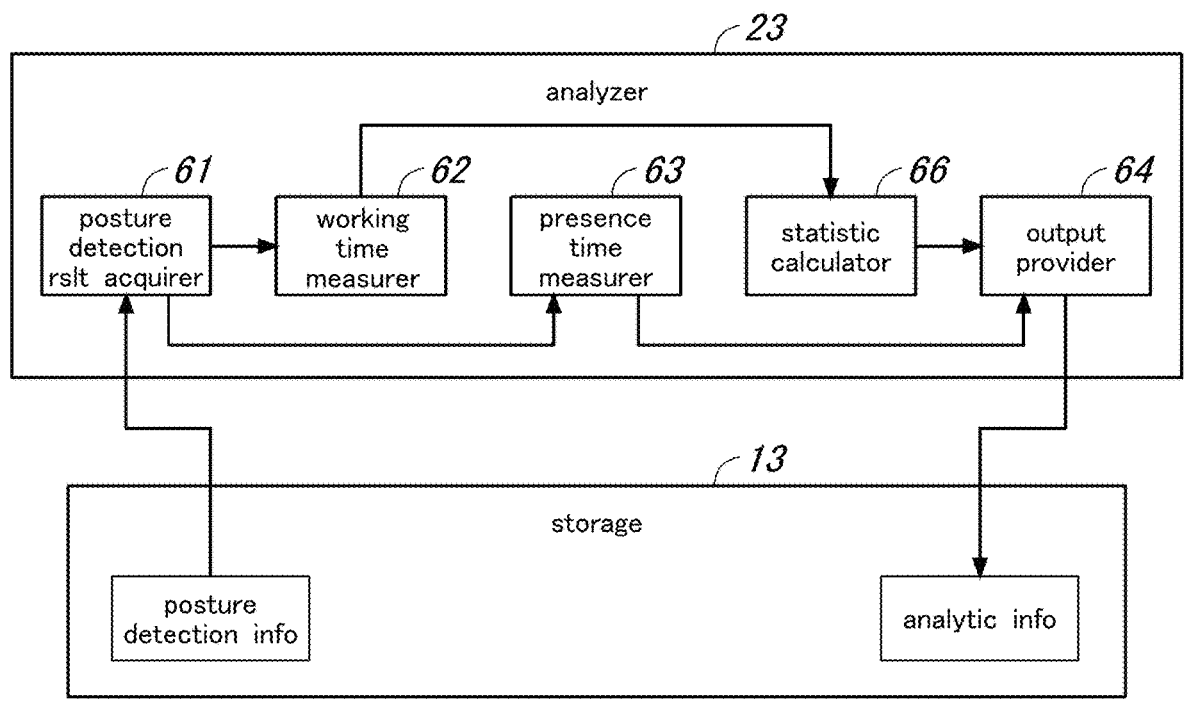
FIG. 15 is a block diagram showing a schematic configuration of an analyzer 23 according to a second variation of the embodiment of the present invention.

Next, a second variation of the embodiment of the present invention will be described. FIG. 15 is a block diagram showing a schematic configuration of an analyzer 23 according to the second variation of the embodiment of the present invention. FIG. 16 is an explanatory diagram showing an analysis result display screen according to the second variation of the embodiment.

In the second variation of the embodiment, the analyzer 23 includes a statistic calculator 66 as shown in FIG. 15. The statistic calculator 66 performs statistical calculation (e.g., averaging) on working times of respective workers in a predetermined data collection period (e.g., one day), and generates statistical information on the working times of the respective workers. Specifically, the statistic calculator 66 generates statistical information for comparison between the working times of respective workers as shown in FIG. 16A. Also, the statistic calculator 66 generates statistical information indicating the transition of working times of a designated worker as shown in FIG. 16B.

In the example shown in FIG. 16A, the working times for respective worker are indicated in bar charts. As a result, an administrator can compare the working times between the respective workers and recognize workers having lower skill levels.

In the example shown in FIG. 16B, the working times of a designated worker at a predetermined point in the past (1 month ago, 2 weeks ago, 1 week ago, yesterday (latest working day)) are indicated in bar charts. As a result, an administrator can recognize how the skill level of the designated worker has been changed.

Specific embodiments of the present invention are described herein for illustrative purposes. However, the present invention is not limited to those specific embodiments, and various changes, substitutions, additions, and omissions may be made for elements of the embodiments without departing from the scope of the invention. In addition, elements and features of the different embodiments may be combined with each other to yield an embodiment which is within the scope of the present invention.

INDUSTRIAL APPLICABILITY

A work analyzing device and a work analyzing method according to the present invention achieve an effect that, even when an increased number of workers become analysis targets, it is possible to make analysis on work efficiency statuses of workers in an efficient manner without putting a greater burden on an administrator to perform setting operations for the analysis, and are useful as a work analyzing device and a work analyzing method in which a processor is caused to perform operations to output analytical information on a work efficiency status of a worker based on video recordings of working activities of the worker.

GLOSSARY 1 camera
2 recorder
3 server
4 administrator terminal
11 video input device
12 screen output device
13 storage
14 controller
21 posture learner
22 posture detector
23 analyzer
24 analysis result visualizer

The invention claimed is:

1. A work analyzing device in which a processor is caused to perform operations to output analytical information on a work efficiency status of a worker based on second video recordings of working activities of the worker,
wherein the processor is configured to:
generate, based on first video recordings for training and by using machine learning, a posture class estimation model configured to perform a posture match determination;
determine whether the worker is present at a place of working based on the second video recordings;
start measuring a presence time of the worker in response to the worker being at the place of working;
perform a joint position estimation based on the second video recordings to estimate joint positions of the worker;
perform a posture match determination based on results of the joint position estimation and using the posture class estimation model to determine a posture match between a posture of the worker and a predetermined reference body posture;
start measuring a working time of the worker in response to the posture match being determined, the worker being at the place of working, and the worker not working;
stop measuring the working time of the worker in response to the posture match being determined, the worker being at the place of working, and the worker working; and
generate, based on the presence time and the working time, the analytical information on the work efficiency status of the worker.

2. The work analyzing device according to claim 1, wherein the processor is configured to:
by using the machine learning, create first machine-learned information for the joint position estimation and second machine-learned information for the posture match determination, trained with the first video recordings for training, information records of joint positions of the worker in the first video recordings, and information indicating whether or not to achieve the posture match;
perform the joint position estimation based on the first machine-learned information for the joint position estimation; and
perform the posture match determination based on the results of the joint position estimation and the second machine-learned information for the posture match determination.

3. The work analyzing device according to claim 1, wherein the processor is configured to:
acquire, based on results of the posture match determination, the working time of the worker during which the worker has been actually working at the place of working, as the analytical information.

4. The work analyzing device according to claim 3, wherein the processor is configured to:
perform a presence determination to determine whether or not the worker is present at the place of working; and acquire, based on results of the presence determination, the presence time of the worker during which the worker has been present at the place of working, as the analytical information.

5. The work analyzing device according to claim 3, wherein the processor is configured to:
   acquire a second working time of a skilled worker as a standard time; and
   compare the working time of the worker with the standard time, thereby acquiring evaluation information as the analytical information, the evaluation information including an evaluated value of working efficiency of the worker.

6. The work analyzing device according to claim 1, wherein the processor is configured to:
   perform the posture match determination on each of a plurality of workers;
   create the analytical information on each worker of the plurality of workers based on results of the posture match determination for each worker; and
   perform statistic calculation on analytical information on each worker to generate statistical information on the work efficiency status of the worker.

7. The work analyzing device according to claim 1, wherein the processor is configured to:
   perform the posture match determination to determine the posture match between the posture of the worker and any one of a plurality of predetermined reference body postures; and
   generate the analytical information based on the one of the plurality of predetermined reference body postures for which the posture match is determined.

8. The work analyzing device according to claim 1, wherein the processor is further configured to:
   display, on a terminal, an analysis result display screen that includes the analytical information, with the working time and the presence time being superimposed on the analysis result display screen.

9. A work analyzing method for causing a processor to perform operations to output analytical information on a work efficiency status of a worker based on second video recordings of working activities of the worker, the operations comprising:
   generating, based on first video recordings for training and by using machine learning, a posture class estimation model configured to perform a posture match determination;
   determining whether the worker is present at a place of working based on the second video recordings;
   starting measurement of a presence time of the worker in response to the worker being at the place of working;
   performing a joint position estimation based on the second video recordings to estimate joint positions of the worker;
   performing a posture match determination based on results of the joint position estimation and using the posture class estimation model to determine a posture match between a posture of the worker and a predetermined reference body posture;
   starting measurement of a working time of the worker in response to the posture match being determined, the worker being at the place of working, and the worker not working;
   stopping measurement of the working time of the worker in response to the posture match being determined, the worker being at the place of working, and the worker working; and
   generating, based on the presence time and the working time, the analytical information on the work efficiency status of the worker.

* * * * *